United States Patent [19]

Moritz

[11] Patent Number: 4,702,281
[45] Date of Patent: Oct. 27, 1987

[54] CARRIER FOR ENERGY AND SUPPLY LINES

[75] Inventor: Werner Moritz, Siegen, Fed. Rep. of Germany

[73] Assignee: Kabelschlepp GmbH, Siegen, Fed. Rep. of Germany

[21] Appl. No.: 920,245

[22] Filed: Oct. 17, 1986

[30] Foreign Application Priority Data

Oct. 25, 1985 [DE] Fed. Rep. of Germany ....... 3537961

[51] Int. Cl.⁴ .............................................. F16L 11/18
[52] U.S. Cl. .................................. 138/120; 191/12 C; 285/163
[58] Field of Search ............... 138/120, 121, 155, 108, 138/162, 163; 285/163, 164; 59/78.1; 191/12 R, 12 C

[56] References Cited

U.S. PATENT DOCUMENTS

| | | | |
|---|---|---|---|
| 3,330,105 | 7/1987 | Weber | 138/120 X |
| 4,111,236 | 9/1978 | Moritz | 138/120 |
| 4,228,825 | 10/1980 | Moritz et al. | 138/120 |
| 4,392,344 | 7/1983 | Gordon | 138/121 X |
| 4,432,349 | 2/1984 | Oshiro | 138/120 X |

FOREIGN PATENT DOCUMENTS 3040761  3/1982  Fed. Rep. of Germany .

*Primary Examiner*—James E. Bryant, III

*Attorney, Agent, or Firm*—Becker & Becker

[57] ABSTRACT

A tube-like carrier, for energy and supply lines, comprising a plurality of interlocking link and bracket members that can be angled relative to one another. Inwardly disposed link members are provided with outwardly directed stops, and outwardly disposed bracket members, which interconnect adjacent link members, are provided with inwardly directed stops, with the stops of the link and bracket members interlocking with one another. On the upper and lower sides of the carrier, the link and bracket members leave respective openings that extend in the longitudinal direction of the carrier. Each opening is spanned by a flexible cover strip. To be able to provide a plurality of tube cross-sections, the link members are in the form of pairs of link members, with the link members of a given pair being disposed on opposite sides of the openings. A respective crosspiece is secured to, and disposed between, the two link members of each pair of link members. The bracket members are in the form of pairs of bracket members, with bracket members of a given pair being disposed on opposite sides of the openings and interconnecting adjacent pairs of link members in such a way that the latter can be angled relative to one another. A pair of flexible cover strips is provided, one spanning each opening, with each cover strip being disposed between corresponding ends of the link members of a given pair of link members.

9 Claims, 4 Drawing Figures

CARRIER FOR ENERGY AND SUPPLY LINES

BACKGROUND OF THE INVENTION

The present relates to a tube-like carrier or conductor for energy lines and other supply lines, with the carrier being disposed between a fixed connection and a movable consuming device. The carrier comprises a plurality of interlocking link members and bracket members that can be angled relative to one another. The inwardly disposed link members are provided with outwardly directed stops, and the outwardly disposed bracket members, which interconnect adjacent link members, are provided with inwardly directed stops, with the outwardly directed stops and the inwardly directed stops interlocking with one another. The link members and the bracket members leave respective openings that extend in the longitudinal direction of the tube-like carrier on the upper and lower sides of the latter; each opening is spanned in a cantilever fashion by a flexible cover strip.

U.S. Pat. No. 4,420,017 which belongs to the assignee of this application, discloses an energy line carrier that is intended for insertion between a fixed connection and a movable consuming device, such as the support of a machne tool, in order to guide energy and supply lines, such as cables and hoses for electricity, compressed air, and/or coolant, in a protective and tension-relieved manner. The carrier must be self-supporting so that it does not sag and unduly bend the energy lines. Furthermore, the energy line carrier must be able to curve only about a specific radius in conformity with the permissible bending radius of the most sensitive of the energy lines. These conditions for self-supporting construction are fulfilled by the heretofore known energy line carrier via a plurality of interlocking link members and bracket members that can be angled relative to one another. The inwardly disposed link members are provided with outwardly directed stops, whereas the outwardly disposed bracket members, which interconnect adjacent link members, are provided with inwardly directed stops, with the stops of the link members and the bracket members interlocking with one another.

The drawback of this known energy line carrier is that with a predetermined size of the link members and bracket members, it is possible to only produce a specific tube cross-section for the carrier. If, for example to accommodate a further energy line, the carrier is to be widened, appropriately wider link members and bracket members must be provided and assembled; this involves high tooling costs.

Applicant's copending application, Ser. No. 832,814, filed Feb. 21, 1986, now U.S. Pat. No. 4,669,507, proposes that the link and bracket members leave an opening on the upper or lower side of the tube, with a flexible cover strip being provided to span this opening in a cantilever fashion. However, this flexible cover strip serves only for rapid replacement or removal of the energy lines without it being necessary to completely disassemble the carrier.

Starting from there, it is an object of the present invention to provide an energy line carrier that permits a plurality of tube cross-sections to be produced with little machining cost.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
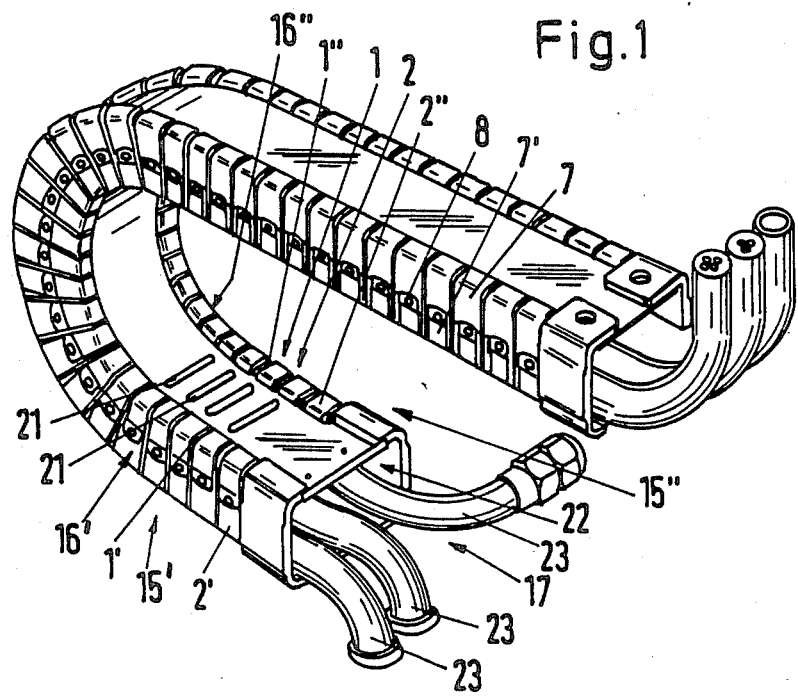
FIG. 1 is a perspective view of one exemplary embodiment of the inventive energy line carrier.

The energy and supply line carrier of the present invention comprises: link members in the form of pairs of link members, with the link members of a given pair being disposed on opposite sides of the openings, the link members forming side walls for the carrier, with each link member having ends; a respective crosspiece secured to, and disposed between, the two link members of each pair of link members; bracket members in the form of pairs of bracket members, with the bracket members of a given pair being disposed on opposite sides of the openings and interconnecting adjacent pairs of link members in such a way that the latter can be angled relative to one another; and a cover strip in the form of a pair of flexible cover strips, one spanning each opening, with each cover strip being disposed between corresponding ends of the link members, of a given pair of link members, on opposite sides of a given one of the openings.

An energy line carrier embodied pursuant to the present invention has the advantage that a plurality of different tube cross-sections, especially different tube widths, can be provided for the carrier at little tooling cost. In order to increase or decrease the width of the energy line carrier, it is merely necessary to insert correspondingly longer or shorter crosspieces between the two link members of each pair of link members. In so doing, the size of the individual link and bracket members remains the same. In addition to the different lengths of crosspieces, it is merely necessary to provide different widths for the flexible cover strips. If furthermore the height of the energy line carrier tube is also to be altered, it is merely necessary to provide link and bracket members of a different height. A plurality of tube cross-sections can thus be realized with only a few different sizes of the link and bracket members, and of the crosspieces, so that practically speaking with the mechanical assembly system, each predetermined energy line arrangement can be provided with a matching energy line carrier.

In one practical embodiment of the present invention, the inner sides of the link members can be provided with recesses for accommodating the crosspieces, with the latter being securely connected to the link members by screws that can be inserted from the outside through the link members. In this manner, the crosspieces can be secured to the link members in a simple manner, with the recesses and the screw connections assuring a secure hold and hence great stability.

The crosspieces are preferably installed between the link members in the region of one of the cover strips. This has the advantage that the crosspieces do not significantly obstruct the path of the energy lines.

Alternatively, the crosspieces can be mounted in the middle between the link members. In this embodiment, the crosspieces serve as separating elements for the situation where two superimposed layers of energy lines are to be disposed in the carrier.

Pursuant to a further inventive embodiment, it is proposed that several crosspieces be inserted between the corresponding link members of a pair of link members. The stability of the energy line carrier can be further improved by such a plurality of crosspieces. This is particularly important when the carrier is to accommodate a number of energy lines.

Separating elements can also be disposed on the crosspieces, so that it is possible to have an orderly disposition of the energy lines within the carrier.

Pursuant to a preferred embodiment of the present invention, the free ends of the bracket members are bent inwardly in a U-shaped manner and engage the ends of the link members from behind. This assures a secure connection between adjacent pairs of link members.

Pursuant to a further inventive embodiment, it is proposed that the inner sides of the ends of the link members be provided with guide slots for the insertion of the cover strips. These guide slots on the ends of the link members make it easy to insert the cover strips. Furthermore, these guide slots assure a secure holding of the cover strips between the link members.

It is finally proposed pursuant to the present invention that the cover strips be provided with reinforcing pins or beads. This further improves the stability of the tube of the energy line carrier.

Further specific features of the present invention will be described in detail subsequently.

DESCRIPTION OF PREFERRED EMBODIMENTS

Referring now to the drawing in detail, the illustrated carrier or conductor for energy lines and other supply lines comprises an alternating succession of link members 1 and holder or bracket members 2 that are positively connected together. These link and bracket members can be pivoted relative to one another out of the extended position to one side only, whereas in the stretched position a rigid article is formed in the other three directions. This is illustrated in FIG. 1, where the upper region of the carrier does not sag, and the carrier can be bent in the other direction.

The link members 1 are embodied as pairs of link members 1', 1'', and the bracket members 2 are embodied as pairs of bracket members 2', 2''. The upper and lower ends 3 of the individual link members 1', 1'' are provided with outwardly directed stops 4, 5 that form grooves 6 between them. When viewed in the extended position of the carrier, the stops 4 extend at an angle, and the stops 5 extend radially. Each of the bracket members 2', 2'' is comprised of two segments 7, 7' that are held together by an expanding rivet 8. The bracket members 2', 2'' are provided with inwardly directed stops 9 that interlock with the stops 4, 5 of the link members 1', 1'' in the grooves 6. The free ends 10 of the segments 7, 7' of the bracket members 2', 2'' are bent inwardly in a U-shaped manner and engage the ends 3 of the link members 1', 1'' from behind.

Since the stops 4 extend at an angle and the stops 5 extend radially, adjacent link members 1', 1'' can be bent in one direction only, whereas in the other direction the stop 9 of the bracket member 2', 2'' rest against the radial stop 5 of the link member 1', 1'' in the extended position of the carrier, thus preventing bending.

Figures 2, 3, 4:
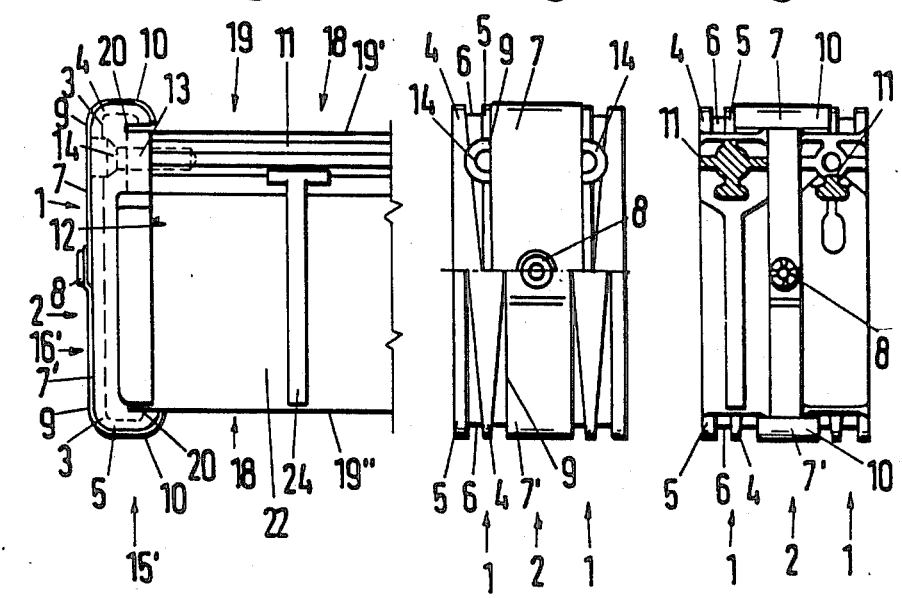
FIG. 2 is an enlarged side view, from outside the energy line carrier, and shows two adjacent link members interconnected by a central bracket member.
FIG. 3 is a cross-sectional view similar to the view of FIG. 2, but is taken from the inside of the carrier.
FIG. 4 is a view taken at right angles to the views of FIGS. 2 and 3 looking in the longitudinal direction of the energy line carrier, with the right half being omitted.

The associated link members 1, 1'' of each pair of link members are interconnected via a bar or crosspiece 11, with the link members 1', 1'' being disposed parallel to one another and, together with the crosspiece 11, forming a U-profile. To secure the crosspieces 11 to the link members 1', 1'', the inner sides 12 of the latter are provided with recesses 13 into which the crosspieces 11 are inserted. Screws 14 serve to secure the crosspieces 11 in the recesses 13. These screws 14 are screwed into the crosspieces 11 from the outside through the link members 1', 1''. This can be seen clearly from FIGS. 2 and 4.

The adjacent link members 1', 1'', which are interconnected by the bracket members 2', 2'', form links 15', 15'' as side walls 16', 16'' of a hose or tube 17. In order to close off the upper and lower openings 18 of the tube 17, cover strips 19 in the form of pairs of cover strips 19', 19'' are provided which span the openings 18 in a cantilever fashion. For this purpose, the ends 3 of the link members 1', 1'' are provided with guide slots 20 into which the cover strips 19 are inserted. To reinforce the inventive carrier, the cover strips 19 can be provide with transversely extending reinforcing fins or beads 21.

The lateral link members 1', 1'', together with the upper and lower cover strips 19, form an interior 22 of the carrier through which can be placed energy or other supply lines 23. Separating elements 24 can be inserted on the crosspieces 11 for orderly placement of the energy lines 23.

The lateral link members 1', 1'', together with the crosspieces 11 and the upper and lower cover strips 19, form a mechanical assembly with which tubes of various cross-sections can be produced. By varying the lengths of the crosspieces 11, tubes 17 of different widths can be produced in conformity with the number of energy lines 23 that are to be placed therein. By varying the height of the link members 1', 1'' and, in conformity therewith, the height of the bracket members 2', 2'', different heights for the tube 17 can be provided in conformity with the thickness of the energy lines 23 that are to be placed therein. Thus, pursuant to the teaching of the present invention, it is possible to provide a plurality of tube cross-sections for the inventive carrier with few link members 1', 1'' of various sizes (along with the matching bracket members 2', 2''), and with few crosspieces 11 of various lengths (along with the correspondingly wide cover strips), so that the tooling costs are only slight. With a given mechanical assembly, practically all energy line arrangements are possible in a given carrier.

The present invention is, of course, in no way restricted to the specific disclosure of the specification and drawing, but also encompasses any modifications within the scope of the appended claims.

What I claim is:

1. A tube-like carrier for energy lines and other supply lines, with said carrier being disposed between a fixed connection and a movable consuming device; the carrier comprises a plurality of interlocking link members and bracket members that can be angled relative to one another; inwardly disposed link members are provided with outwardly directed stops, and outwardly disposed bracket members, which interconnect adjacent link members, are provided with inwardly directed stops, with said stops of said link members and said stops of said bracket members interlocking with one another; on the upper and lower sides of said tube-like carrier, said link members and said bracket members leave respective openings that extend in the longitudinal direction of said carrier; each of said openings is spanned in a cantilever fashion by a flexible cover strip; said carrier further comprising:

- link members in the form of pairs of link members, with the link members of a given pair being disposed on opposite sides of said openings, said link members forming side walls for said carrier, with each of said link members having oppositely disposed ends;
- a respective crosspiece secured to, and disposed between, the two link members of each pair of link members;
- bracket members in the form of pairs of bracket members, with the bracket members of a given pair being disposed on opposite sides of said openings and interconnecting adjacent pairs of link members in such a way that the latter can be angled relative to one another; and
- a pair of flexible cover strips, one spanning each of said openings, with each of said cover strips being disposed between corresponding ones of said ends of said link members, of a given pair of link members, on opposite sides of a given one of said openings.

2. A carrier according to claim 1, in which each of said link members has an inwardly directed side that is provided with a recess to receive said crosspiece, with the latter being secured to its link members via screws that can be inserted through the latter from the outside thereof.

3. A carrier according to claim 1, in which said crosspieces are disposed between said link members in the vicinity of one of said cover strips.

4. A carrier according to claim 1, in which said crosspieces are disposed between said link members approximately centrally between said cover strips.

5. A carrier according to claim 1, which includes several crosspieces disposed between the two link members of each pair of link members.

6. A carrier according to claim 1, in which each of said crosspieces is provided with at least one separating element.

7. A carrier according to claim 1, in which each of said bracket members has free ends that are bent inwardly in a U-shaped manner and engage said ends of the associated link members from behind.

8. A carrier according to claim 1, in which each of said ends of a given link member has an inwardly directed side that is provided with a guide slot for the insertion of one of said cover strips.

9. A carrier according to claim 1, in which said cover strips are provided with reinforcing beads.

* * * * *